(12) United States Patent
Sano et al.

(10) Patent No.: US 8,988,888 B2
(45) Date of Patent: Mar. 24, 2015

(54) INSTRUMENT DEVICE

(75) Inventors: Satoshi Sano, Niigata (JP); Yuichiro Nakamura, Niigata (JP); Katsuhito Umezawa, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 208 days.

(21) Appl. No.: 13/518,773

(22) PCT Filed: Dec. 14, 2010

(86) PCT No.: PCT/JP2010/072427
§ 371 (c)(1),
(2), (4) Date: Jun. 22, 2012

(87) PCT Pub. No.: WO2011/077997
PCT Pub. Date: Jun. 30, 2011

(65) Prior Publication Data
US 2012/0250280 A1 Oct. 4, 2012

(30) Foreign Application Priority Data
Dec. 25, 2009 (JP) .................. 2009-293633

(51) Int. Cl.
*H05K 7/06* (2006.01)
*B60K 35/00* (2006.01)
(52) U.S. Cl.
CPC ......... *B60K 35/00* (2013.01); *B60K 2350/1064* (2013.01)
USPC ........... 361/760; 361/728; 361/752; 361/796; 361/805
(58) Field of Classification Search
CPC .................. B60K 35/00; B60K 2350/1064
USPC ................. 361/728–747, 752–759, 796–802, 361/805–837
See application file for complete search history.

(56) References Cited

U.S. PATENT DOCUMENTS 4,954,807 A * 9/1990 Fleischer et al. ............... 340/459
5,430,612 A * 7/1995 Simon et al. ................... 361/752
(Continued)

FOREIGN PATENT DOCUMENTS

| JP | 57-124722 | 8/1982 |
| JP | 8-128863 | 5/1996 |

(Continued)

OTHER PUBLICATIONS

Machine translation of Sugiyama et al. (JP 2005292074 A).*

*Primary Examiner* — Adrian S Wilson
*Assistant Examiner* — Izak Branowski
(74) *Attorney, Agent, or Firm* — McDermott Will & Emery LLP (57) ABSTRACT

A meter device which can be mounted and removed easier than conventional meter devices. A meter device is provided with a display plate, a circuit board, a middle case which is disposed on the front surface side of the circuit board and on which the display plate is mounted, an upper case which is disposed on the front surface side of the middle case and through which the front surface can be seen, and a lower case which covers the middle case and the circuit board. A flange section which is sandwiched and held between the upper and lower cases is provided to the peripheral edge of the middle case. One of the upper case and the lower cases is provided with engagement sections, and engagement sections which engage with the engagement sections are provided to the other of cases so as to correspond to the engagement sections.

3 Claims, 6 Drawing Sheets

(56) References Cited

U.S. PATENT DOCUMENTS

| | | | |
|---|---|---|---|
| 5,615,080 A * | 3/1997 | Nishitani et al. | 361/664 |
| 5,652,508 A * | 7/1997 | Yamamoto | 324/166 |
| 5,839,811 A * | 11/1998 | Shimura | 362/30 |
| 7,173,827 B2 * | 2/2007 | Sugimoto et al. | 361/760 |
| 2008/0298027 A1* | 12/2008 | Muramatsu | 361/728 |
| 2012/0250280 A1* | 10/2012 | Sano et al. | 361/760 |

FOREIGN PATENT DOCUMENTS

| | | | |
|---|---|---|---|
| JP | 2001-124598 | | 5/2001 |
| JP | 2001-174292 | | 6/2001 |
| JP | 2005-292074 | | 10/2005 |
| JP | 2005292074 A | * | 10/2005 |
| JP | 2007227767 A | * | 9/2007 |
| JP | 2008-075696 | | 4/2008 |

* cited by examiner

INSTRUMENT DEVICE

RELATED APPLICATIONS

This application is the U.S. National Phase under 35 U.S.C. §371 of International Application No. PCT/JP2010/072427, filed on Dec. 14, 2010, which in turn claims the benefit of Japanese Application No. 2009-293633, filed on Dec. 25, 2009, the disclosures of which Applications are incorporated by reference herein.

TECHNICAL FIELD

The present invention relates to an instrument device to be mounted on a vehicle such as automotive vehicles, motorcycles, construction machines, agriculture machines, for example.

BACKGROUND ART

As an instrument device to be mounted on a vehicle or the like of the related art, configurations shown in Patent Document 1 or Patent Document 2 are known. The instrument devices in these Patent Documents include an instrument device including a display panel arranged on the front side of a needle-type indicating instrument such as a speedometer or a tachometer, a circuit board formed of a hard material on which the indicating instrument is mounted, a middle case formed of a resin material, arranged on the front side of the circuit board and configured to place the display panel, an upper case arranged on the front side of the middle case and including a see-through panel member formed of a resin material which allows at least a front surface to be seen through and a facing panel member configured to partition a display area of the display panel, and a lower case formed of a resin material and configured to cover the middle case and the circuit board.

In this case, in order to achieve a simple assembly of the instrument device, for example, a configuration in which operations such as assembly or disassembly is facilitated in comparison with a screw-tightening operation using a screw, which is a separately provided part, by providing claw-shaped hook portions on resilient arm strips and frame-shaped engaging portions configured to engage the hook portions of the resilient arm strips so as to be detachably attachable instead of fixing means on the basis of screw tightening is known.
Patent Document 1: JP-A-2001-174292
Patent Document 2: JP-A-2008-75696

DISCLOSURE OF INVENTION

Problems to be Solved by the Invention

Incidentally, the instrument devices in Patent Document 1 or Patent Document 2 described above are configured, for example, to be engaged and held in such a manner that hook portions for engagement are provided on respective outer peripheral portions of the see-through panel member and the facing panel member as the upper case, the middle case, or the lower case, and a frame-shaped engaging portion are formed on the facing panel member or the middle case or the lower case corresponding to the hook portions. In this case, even though there is no serious problem at the time of assembly, in a case of demounting the respective cases, it is necessary to demount the cases while deflecting a plurality of hook portions engaged and held by the frame-shaped engaging portion. For example, in a case of disassembling the see-through panel member which is an upper case, the facing panel member, the middle case and the lower case, when demounting the see-through panel member, it is necessary to disengage the hook portions provided on the resilient arm strips provided on the see-through panel member simultaneously respectively. If just one of those is in the engaged state, demounting cannot be achieved, which is a burdensome problem. Subsequently, when the facing panel member is demounted from the middle case as well, the hook portions of the resilient arm strips provided on the facing panel member need to be disassembled by being disengaged simultaneously in the same manner. Therefore, the demounting operation including the middle case and the lowercase requires a lot of trouble.

Also, since the circuit board is also assembled and held by the hook portions provided on the middle case or the lower case so as to be engageable and disengageable in the same manner, the assembly and demounting of the circuit board requires a lot of trouble.

In view of the problems described above, it is an object of the present invention to provide an instrument device which achieves easy workability of assembly and demounting in comparison with the related art.

Means for Solving the Problems

In order to solve the above-described problem, according to Claim 1, there is provided an instrument device including: a display panel having arranged on the front side of an indicating instrument; a circuit board formed of a hard material on which the indicating instrument is mounted; a middle case arranged on the front side of the circuit board and formed of a resin material for placing the display panel; an upper case arranged on the front side of the middle case and formed of a resin material which allows seeing therethrough at least on a front surface thereof, a lower case formed of a resin material which covers the middle case and the circuit board, wherein the middle case is provided with a flange portion on a peripheral edge portion thereof for being held by being clamped between the upper and lower cases, one of the upper case or the lower case is provided with locking portions on respective outer peripheral portions thereof at intervals, and the other one of the upper case or the lower case is provided with engaging portions configured to engage the locking portions corresponding to the locking portions.

In this configuration, by providing the locking portions at least one of the upper case side and the lower case side and the engaging portions on the other one of the upper case side and the lower case side at positions corresponding to the locking portion, the middle case can be fixedly held easily between the upper and lower cases while being clamped therebetween, whereby the number of points of assembly between the locking portions and the engaging portions may be reduced and hence operation efficiency such as assembly and demounting can be enhanced.

Also, according to Claim 2, in the instrument device according to Claim 1, the circuit board is clamped and held between the lower case and the middle case.

In this configuration, the circuit board can be included and satisfactorily assembled and held in the upper and lower cases when assembling and fixing the upper and lower cases to each other.

Also, according to Claim 3, in the instrument device in Claim 1 or Claim 2, the lower case is provided with a placing shoulder portion projecting from a bottom surface portion of the lower case toward the circuit board.

In this configuration, since a space corresponding to the thickness of the placing shoulder portion projecting integrally from the lower case toward the circuit board is secured between the lower case and the circuit board, whereby the mounting space for the electronic components or the like to be mounted on the circuit board is secured.

Also, according to Claim 4, in the instrument device in Claim 3, the placing shoulder portion includes a rising wall portion formed so as to rise toward the circuit board side, and a placing portion continuing from the rising wall portion and supporting the backside of the circuit board, the placing portion is provided with an opening window portion, the circuit board is provided with a through hole at a position corresponding to the opening window portion, and the middle case is integrally provided with a locking portion configured to engage the lower case side corresponding to the through hole and the opening window portion.

In this configuration, the circuit board clamped and held between the middle case and the lower case can be held strongly by the locking portion provided on the middle case in cooperation with the lower case, and can be engaged and held in cooperation with the lower case by being clamped between the upper and lower cases, whereby the instrument device superior in quakeproof properties is provided and, in addition, since the locking portion is arranged in the area of the depressed space portion of the placing shoulder portion formed of the rising wall portion and the placing portion, the locking portion can be formed so as not to project from the bottom surface side of the lower case, and hence the problem that the locking portion abuts from the outside and hence is broken can be prevented in advance.

Advantages of the Invention

Since the instrument device according the present invention is the instrument device including: the circuit board having the display panel arranged on the front side of the indicating instrument formed of a synthetic material on which the indicating instrument is mounted; a middle case arranged on the front side of the circuit board and formed of the resin material for placing the display panel; the upper case arranged on the front side of the middle case and formed of the resin material which allows seeing therethrough at least on the front surface thereof, the lower case formed of the resin material which covers the middle case and the circuit board, wherein the middle case is provided with the flange portion on the peripheral edge portion thereof for being held by being clamped between the upper and lower cases, one of the upper case or the lower case is provided with the locking portions on the respective outer peripheral portions thereof at intervals, and the other one of the upper case or the lower case is provided with the engaging portions configured to engage the locking portions corresponding to the locking portions, the middle case can be fixedly held easily between the upper and lower cases while being clamped therebetween, whereby the number of points of assembly between the locking portions and the engaging portions may be reduced and hence operation efficiency such as assembly and demounting can be enhanced, whereby the initial object can be achieved.

BEST MODES FOR CARRYING OUT THE INVENTION

FIG. 1 to FIG. 5 show a first embodiment of the present invention, and the embodiments of the present invention will be described with an example of an instrument device to be mounted, for example, on an automotive vehicle, with reference to these drawings.

In the same drawing, the instrument devices according to this embodiment includes a display panel 20 arranged on the front side of a needle-type indicating instrument 10 such as a speedometer, a tachometer, a fuel meter, a water-temperature meter, a circuit board 30 formed of a hard material on which an instrument body 11 of the indicating instrument 10 is mounted, a middle case 40 formed of a resin material, arranged on the front side of the circuit board 30 and configured to place the display panel 20, an upper case 50 arranged on the front side of the middle case 40 including a see-through panel member 51 formed of a resin material which allows at least a front surface to be seen through and a facing panel member 52 configured to partition a display area of the display panel 20, and a lower case 60 formed of a resin material and configured to cover the middle case 40 and the circuit board 30.

In this case, in each of the indicating instruments 10 which display various information such as a speedometer or a fuel meter, a water-temperature meter, each of the instrument bodies 11 which constitutes part of each of the indicating instruments 10 is fixedly assembled on the back side of the circuit board 30 and needles 13 rotating about needle shafts 12 as center axes are press-fitted and fixed to distal end sides of the needle shafts 12 provided on the respective instrument bodies 11 respectively. The needle structure of this embodiment includes a light-emitting needle 13 formed of a transparent synthetic resin, for example, polycarbonate resin or acryl resin.

In this embodiment, the instrument body 11 includes a movable magnetic instrument or a stepping motor. In this example, the needle shaft 12 is mounted on the back side of the circuit board 30 so as to penetrate through an axial hole formed on the circuit board 30, and is electrically connected to a wiring pattern by appropriate conduction means such as soldering or the like.

Also, provided on the display panel 20, which is arranged on the front side of the middle case 40 positioned on the back side of the needle 13 is a display portion 21 including graduations or numeric characters or symbols and the like. Also, the display panel 20 is provided with a through hole 22 at a position corresponding to the needle shaft 12, and the needle shaft 12 and the needle 13 can be coupled through the through hole 22.

Also, the circuit board 30 is made up of a hard circuit board provided with a wiring pattern (not shown), for example, on a glass epoxy based base material, and includes drive means (not shown) configured to drive and control the instrument body 11 and various electronic components (not shown) for example, such as resistances, condensers connected in conduction with the wiring pattern. Mounted on the circuit board 30 are a light source (a light-emitting diode 70) facing into the frame-shaped middle case 40 for illuminating through the display portion 21 such as graduation portions or numeric characters of the display panel 20 and a light source for a needle (a light-emitting diode 71) for emitting a light beam and illuminating the needle 13, and the instrument body 11 is fixedly assembled to the back side of the circuit board 30 as described above.

Also, the middle case 40 includes side wall portions 41 formed of a white color synthetic resin material into a substantially frame shape as a whole for supporting the indicating instruments 10 such as the speedometer, a liquid level gauge, a water-temperature meter and a horizontal wall portion 42 provided so as to connect midpoints of the side wall portions 41 respectively, and cylindrical portions 43 are formed so as to surround the needle shafts 12 of the respective indicating instruments 10 integrally from the middle case 40 formed into the frame shape, the light sources 71 as the illumination for the needles described above are arranged on the front surface side of the circuit board 30 positioned on the bottom portions of the cylindrical portions 43. In this case, the horizontal wall portion 42 forms a placing surface for placing a dial 20.

Also, the middle case 40 is formed integrally with reflecting wall portions 44 so as to protrude continuously from midpoints of outer peripheral surface of the cylindrical portions 43, and the illuminating light source 70 for illuminating the display portion 21 including graduations or numeric characters as described above therethrough are arranged right under the reflecting wall portions 44. Also, the middle case 40 is also formed integrally with reflecting surface portions 45 configured to reflect and introduce light beam from the light sources 70 via the reflecting wall portions 44 and reflect and introduce the reflected and introduced light beam further toward the display portions 21 of the display panels 20 so as to continue from the horizontal wall portion 42 of the middle case 40.

Also, the see-through panel member 51 which constitutes part of the upper case 50 is formed of, for example, a transparent synthetic resin, and are provided so as to allow seeing through of the display portions 21 on the display panels 20.

Also, the facing panel member 52 which constitutes part of the upper case 50 is formed of, for example, a black synthetic resin, and is provided so as to partition the areas of the display portions 21 on the display panels 20 in a frame shape so as to provide visibility thereof.

Also, the lower case 60 is formed of, for example, a synthetic resin, and is formed into a bottomed frame shape so as to cover the backside of the circuit board 30 and the outer peripheral side of the middle case 40.

Incidentally, as a configuration as an assembling and demounting structure for the respective component members of the instrument device according to this embodiment, the respective component members of the upper case 50 or the middle case 40 and the lower case 60 employ the following structure.

A plurality of locking portions 510 are integrally provided at suitable positions of an outer peripheral portion of the see-through panel member 51 at predetermined intervals. In this case, the locking portions 510 each are formed with a resilient arm strip 511 projecting from the outer peripheral portion of the see-through panel member 51 toward the lower case 60 integrally and a claw-shaped hook portion 512 provided at a distal end portion of the resilient arm strip 511.

Also, frame-shaped engaging portions 520 are provided integrally at positions opposing the locking portions 510 on the side of the facing panel member 52 in order to receive some of the locking portions 510 provided on the see-through panel member 51, and locking portions 523 each formed with a resilient arm strip 521 and a hook portion 522 are integrally provided at suitable positions on an outer peripheral portion of the facing panel member 52 at regular intervals in the same manner as the see-through panel member 51.

Also, the lower case 60 is provided with frame-shaped engaging portions 600 at positions of an outer peripheral portion of the lower case 60 so as to receive the locking portions 510 each formed with the resilient arm strip 511 and the hook portion 512 provided on the see-through panel member 51 and the locking portions 523 each formed with the resilient arm strip 521 and the hook portion 522 provided on the facing panel member 52, respectively.

Also, the middle case 40 is formed with a flange portion 400 projecting outward in the horizontal direction at an upper peripheral end edge portion of the middle case, and the flange portion 400 is provided so as to be clamped and held between the upper case 50 and the lower case 60.

Also, the circuit board 30 disposed between the middle case 40 and the lower case 60 is provided so as to be clamped and held between the middle case 40 side and the lower case 60 side in this embodiment. In this case, the lower case 60 is provided with a placing portion 610 projecting from a bottom surface portion of the lower case 60 toward the circuit board 30. With the thickness of the placing portion 610, amounting space for the electronic components and the instrument body 11 to be mounted on the circuit board 30 is secured.

In the instrument device in the first embodiment configured in this manner, the assembly is performed as follows. First of all, the instrument bodies 11 which constitute parts of the respective indicating instruments 10 are assembled and fixed to the circuit board 30 respectively and are electrically routed and, in this state, the circuit board 30 is set with reference to the lower case 60. Subsequently, in a state in which the display panels 20 are arranged on the front side of the middle case 40, these members are set in the lower case 60. Subsequently, the proximal sides of the needles 13 are press-fitted and fixed to distal end sides of the needle shafts provided on the respective instrument bodies 11. Accordingly, the circuit board 30 including the instrument bodies 11 assembled thereto with reference to the lower case 60, the middle case 40 and the display panel 20 are set in a stacked manner. In addition, the facing panel member 52 and the see-through panel member 51 which form the upper case 50 are assembled to the lower case 60 side in a stacked manner, the locking portions 523, 510 provided respectively on the facing panel member 52 and the see-through panel member 51 are fed along the frame-shaped engaging portions 600 provided on the lower case 60 side and the hook portions 522, 511 provided on the respective locking portions 523, 510 engage the frame-shaped engaging portions 600 and are held so as not to be disconnected.

In this case, the middle case 40 can be clamped and held between the upper case 50 and the lower case 60 via the flange portion 400 provided on the middle case 40 only by engaging and fixing the locking portions 523, 510 provided on the upper case 50 side with respect to the engaging portions 600 of the lowercase 60. In addition, at the same time as this engagement and fixation, the circuit board 30 can be clamped and held between the middle case 40 and the lower case 60, so that increase in efficiency of the assembling operation is achieved.

Therefore, when disassembling (demounting) the instrument device, separation is easily achieved only by disengaging engaged portions between the locking portions 523, 510 provided on the upper and lower cases 50, 60 and the engaging portions 600, so that the middle case 40 or the circuit board 30 can be demounted easily.

For reference, at the time of illumination during night, when the light sources 71 for illuminating the needle configured to emit a light beam and illuminate the needle 13 emit light beams, the illuminating light beams are guided in the inner portion of the cylindrical portion 43 of the middle case 40 and is guided toward the proximal side of the needle 13 through the through hole of the display panel 20, and then is guided from the proximal side to the indicating portion, whereby the indicating portion of the needle 13 is illuminated.

Also, when the light source 70 for illuminating the display portion emits a light beam simultaneously with illumination of the needle 13, the illuminating light beam is reflected by the reflecting wall portion 44 provided right above the light source 70, and the reflected light beam is guided to the reflecting surface portion 45 and is reflected again, whereby the display portion 21 of the display panel 20 is illuminated brightly therethrough.

Figure 1:
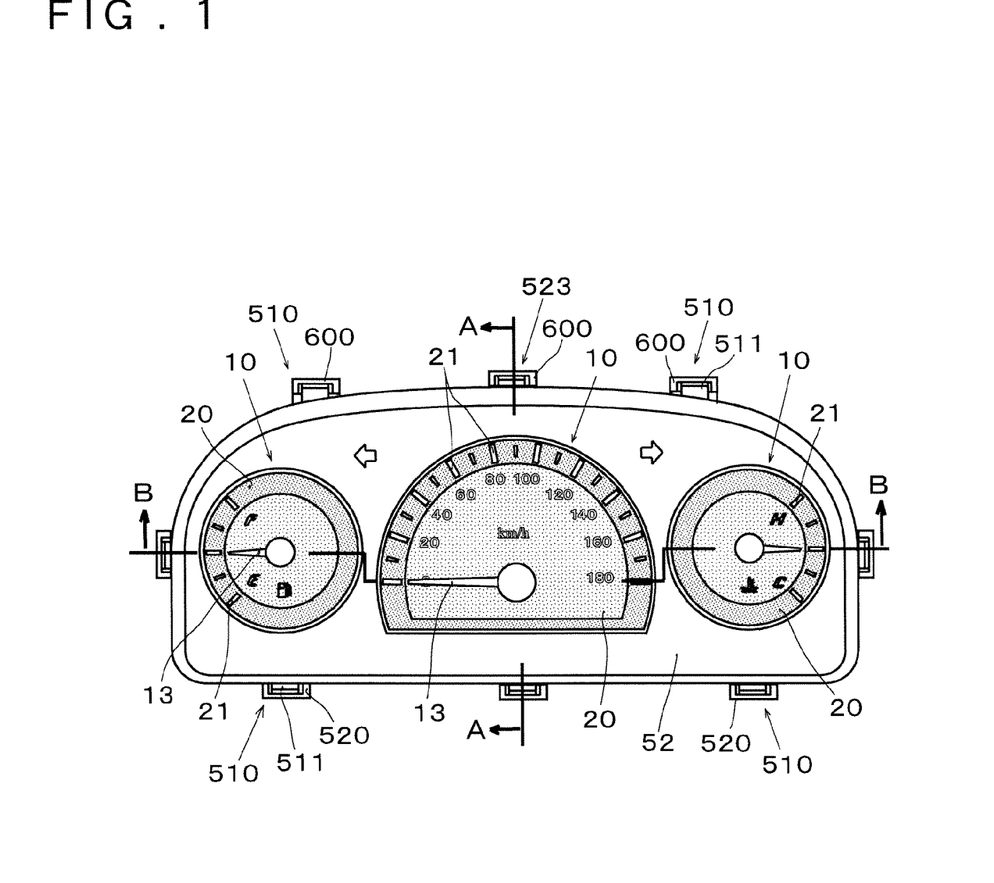
FIG. 1 is a front view showing an instrument device according to a first embodiment of the present invention.
Figure 2:
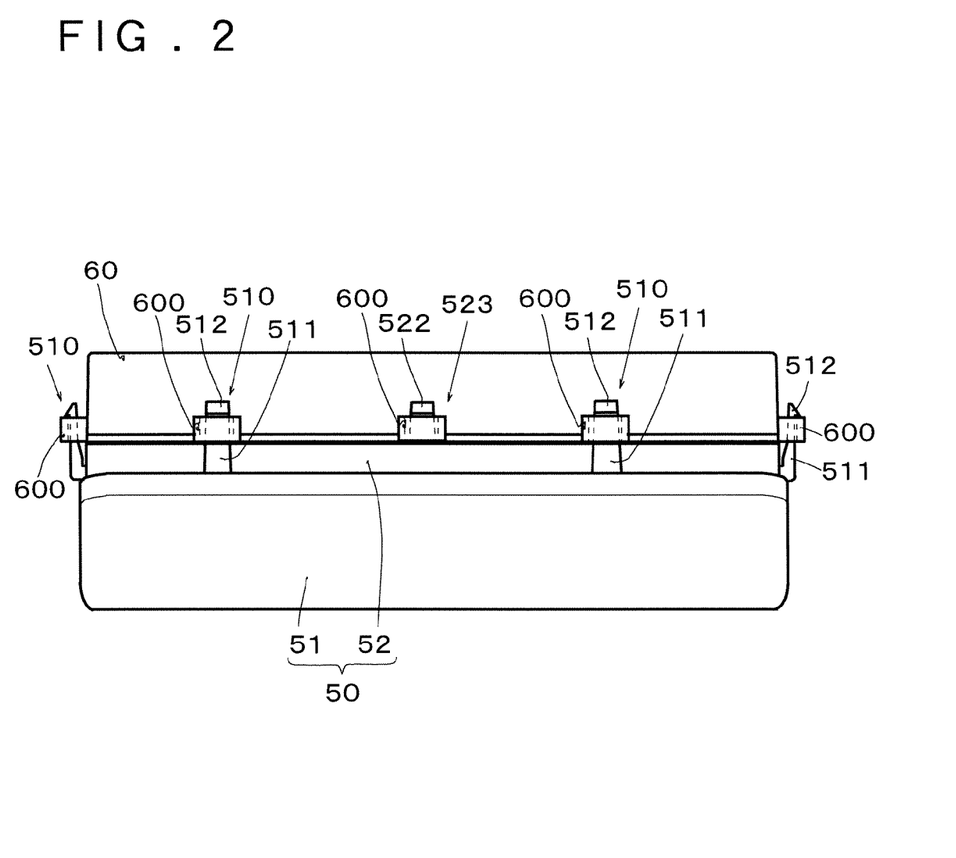
FIG. 2 is a plan view showing an appearance of the instrument device shown in FIG. 1.
Figure 3:
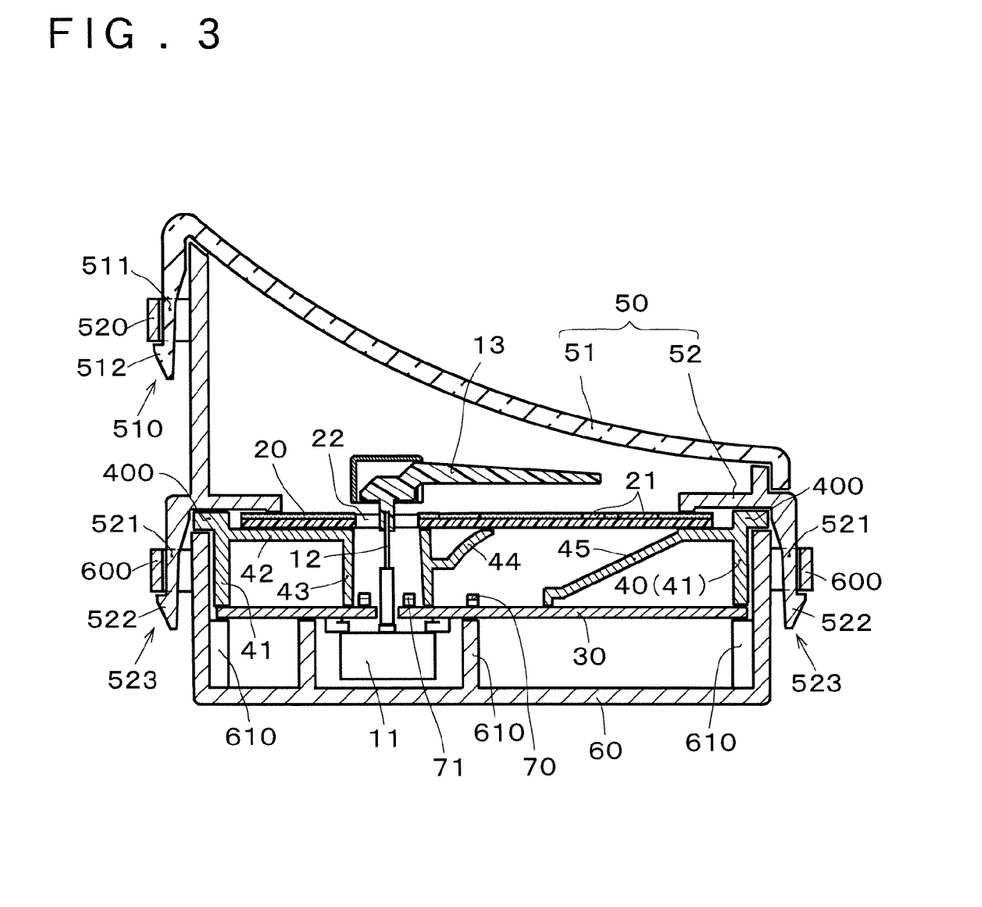
FIG. 3 is an enlarged cross-sectional view of the instrument device showing a portion along the line A-A in FIG. 1.
Figure 4:
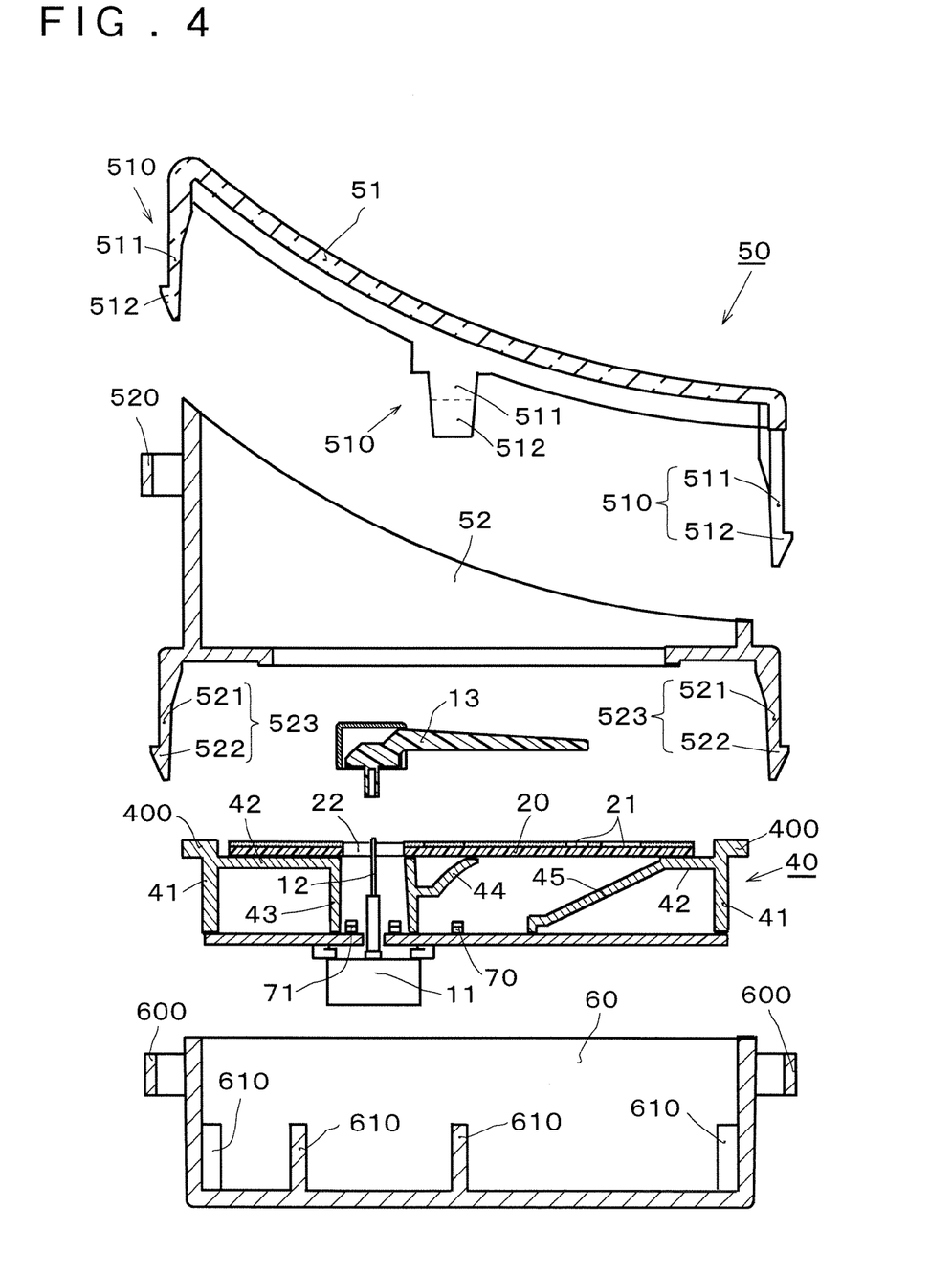
FIG. 4 is a cross-sectional view of the instrument device showing a state before assembly of FIG. 3.
Figure 5:
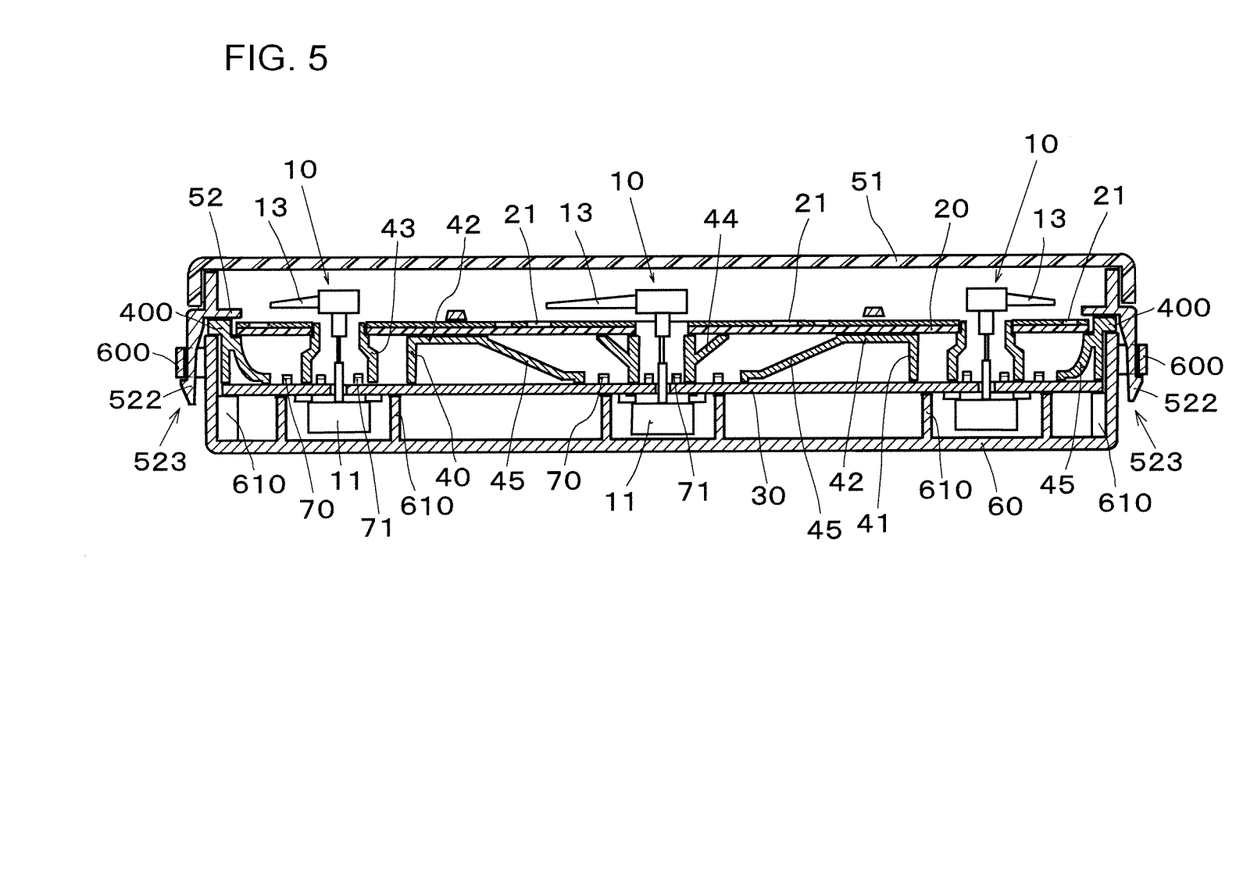
FIG. 5 is a cross-sectional view showing a portion along the line B-B in FIG. 1.
Figure 6:
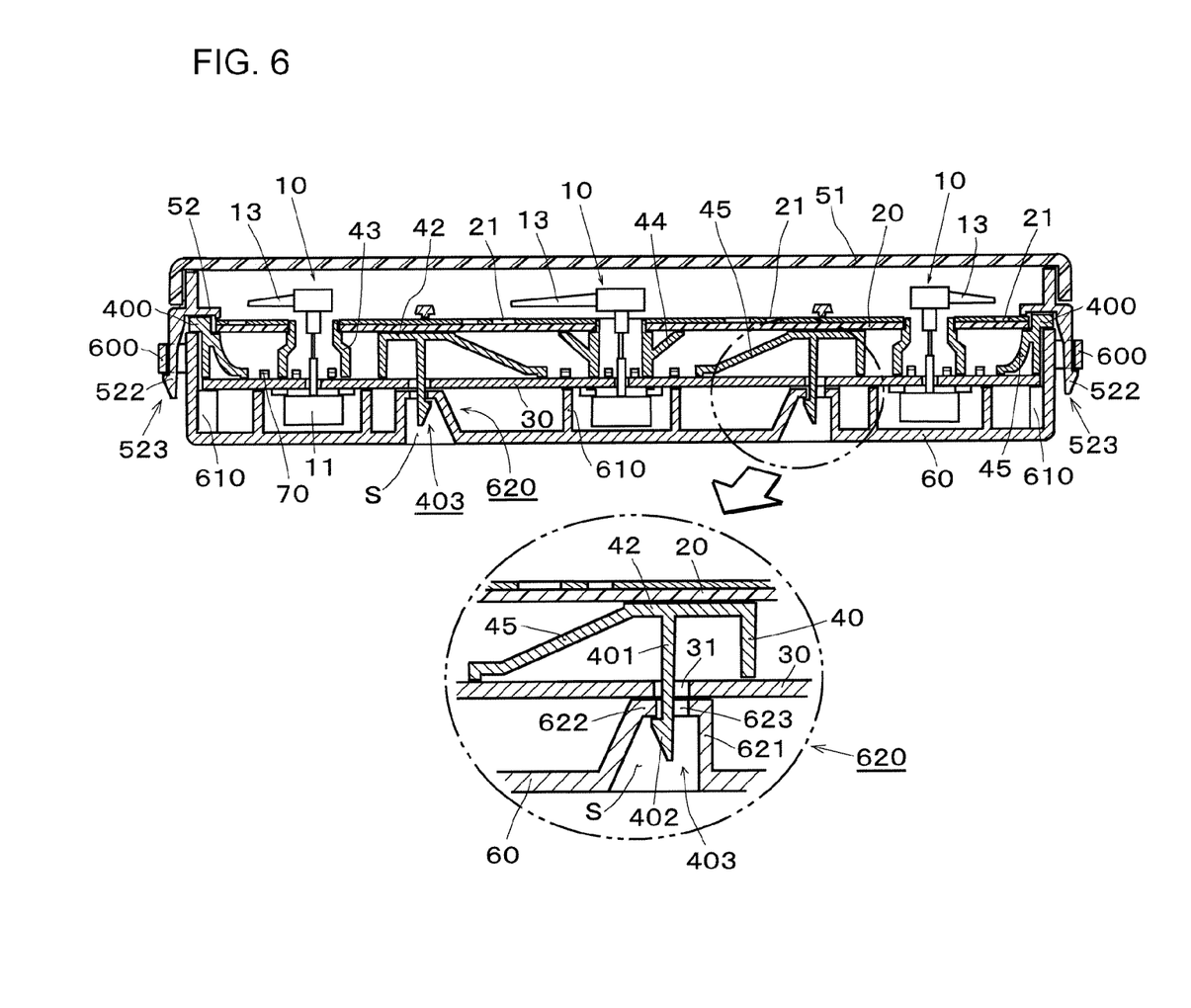
FIG. 6 is a cross-sectional view showing an instrument device according to a second embodiment of the present invention.

Also, FIG. 6 shows a second embodiment of the present invention. In the almost same manner as the first embodiment shown in FIG. 1 to FIG. 4 described above, a plurality of locking portions 510 are integrally provided at suitable portion of the outer peripheral portion of the see-through panel member 51 at regular intervals. In this case, the locking portions 510 each are formed of the resilient arm strip 511 projecting from the outer peripheral portion of the see-through panel member 51 toward the lower case 60 integrally and the claw-shaped hook portion 512 provided at the distal end portion of the resilient arm strip 511.

Also, frame-shaped engaging portions 520 are provided integrally at the positions opposing the locking portions 510 on the side of the facing panel member 52 in order to receive some of the locking portions 510 provided on the see-through panel member 51, and the locking portions 523 each formed with the resilient arm strip 521 and the hook portion 522 are integrally provided at suitable positions on the outer peripheral portion of the facing panel member 52 at regular intervals in the same manner as the see-through panel member 51.

Also, the lowercase 60 is provided with the frame-shaped engaging portions 600 at positions of the outer peripheral portion of the lower case 60 so as to receive the locking portions 510 each formed with the resilient arm strip 511 and the hook portion 512 provided on the see-through panel member 51 and the locking portions 523 each formed with the resilient arm strip 521 and the hook portion 522 provided on the facing panel member 52, respectively.

Also, the middle case 40 is formed with the flange portion 400 projecting outward in the horizontal direction at the upper peripheral end edge portion of the middle case, and the flange portion 400 is provided so as to be clamped and held between the upper case 50 and the lower case 60.

Also, in the second embodiment, as shown in FIG. 6, locking portions 403 each including a resilient arm strip 401 and a hook portion 402 are formed integrally with the middle case 40 and extending toward the lower case 60 at suitable positions (two positions) in an area at the center of the middle case 40.

Also, the lower case 60 is formed with a placing portion 620 depressed from a bottom surface portion of the middle case 40 at a position corresponding to the locking portion 403 of the middle case 40.

At this time, a depressed space portion S is formed of a rising wall portion 621 formed to rise toward the circuit board 30 and a placing surface portion 622 continuing from the rising wall portion 621 for supporting the back side of the circuit board 30 as the placing portion 620, an opening window portion 623 is formed on the placing surface portion 622, and the circuit board 30 is formed with a through hole 31 at a position corresponding to the opening window portion 623.

In the instrument device according to the second embodiment configured as described above, in the same manner as the first embodiment described above, the circuit board 30 including the instrument bodies 11 assembled thereto with reference to the lower case 60, the middle case 40 and the display panel 20 are set in a stacked manner. In addition, the facing panel member 52 and the see-through panel member 51 which form the upper case 50 are assembled to the lower case 60 side in a stacked manner, the locking portions 523, 510 provided respectively on the facing panel member 52 and the see-through panel member 51 are fed along the frame-shaped engaging portions 600 on the lower case 60 side and the hook portions 522, 511 provided on the respective locking portions 523, 510 engage the frame-shaped engaging portions 600 and are held so as not to be disconnected.

In this case, the middle case 40 can be clamped and held between the upper case 50 and the lower case 60 via the flange portion 400 provided on the middle case 40 only by engaging and fixing the locking portions 523, 510 provided on the upper case 50 side with respect to the engaging portions 600 of the lowercase 60. In addition, at the same time as this engagement and fixation, the circuit board 30 can be clamped and held between the middle case 40 and the lower case 60, so that increase in efficiency of the assembling operation is achieved.

Therefore, when disassembling (demounting) the instrument device, in the same manner as the first embodiment described above, separation is easily achieved only by disengaging engaged portions between the locking portions 523, 510 provided on the upper and lower cases 50, 60 and the engaging portions 600, so that the middle case 40 or the circuit board 30 can be demounted easily.

Also, in the second embodiment, the circuit board 30 clamped and held between the middle case 40 and the lower case 60 can be held strongly by the locking portion 403 provided on the middle case 40 in cooperation with the lower case 60, and the middle case 40 clamped and held between the upper and lower cases 50, 60 can be engaged and held in cooperation with the lower case 60, whereby the instrument device superior in quakeproof properties is provided and, consequently, generation of abnormal sound such as squeak noise caused by sympathetic vibration or the like may be inhibited.

In addition, since the locking portion 403 provided integrally from the middle case 40 is arranged in the area of the depressed space portion S of the placing portion 620 formed of the rising wall portion 621 and the placing surface portion 622, the locking portion 403 can be formed so as not to project from the bottom surface side of the lower case 60, and hence the problem that the locking portion 403 abuts from the outside and hence is broken can be prevented in advance.

For reference, the present invention is not limited to the embodiments described above, can be modified in a various manner within the range of the scope of the present invention. For example, although the needle-type indicating instrument 10 has been described as an example in the embodiments, an indicating instrument on the basis of the display device formed of a liquid crystal element, for example, is also applicable. Depending on the case, enhancement of operation efficiency of assembly and demounting may also be achieved with a configuration in which the circuit board 30 is assembled to the middle case 40, and the middle case 40 assembled with the circuit board 30 is fixedly held by being clamped between the upper case 50 and the lower case 60 is also applicable. Also, the shape of the hooks of the locking portion and the engaging portion is not limited to the structure shown in the embodiments. For example, a hooking configuration between a locking portion and an engaging portion formed, for example, of a combination of a flat-panel-shaped angular-C-shaped resilient strip and a triangular projecting portion is also applicable and achieves the same effects. Furthermore, the positions to be provided and the number of the placing portions 620 formed with the depressed space portion S for placing the circuit board 30 may be set according to the size of the parts to be mounted on the circuit board 30, the circuit board 30 or the middle case 40.

Also, as means for securing the display panel 20 on the front surface side of the middle case 40, for example, adhesion using a double-faced adhesive tape, or hooking of the display panel 20 using the hook portion projected integrally from the middle case 40 may also be applicable, and may be set as needed as fixing means.

INDUSTRIAL APPLICABILITY

Also, as described in detail in the above-described embodiments, the instrument device for vehicles has been described as an example. However, the same configuration may be applied to marine instruments or instrument devices for special vehicles such as agricultural machines or construction machines in addition to the instrument device for vehicles or, alternatively, in indicating instruments using a display element formed of, for example, an EL display panel, in addition to the indicating instruments of a needle type or a liquid crystal type and achieves the same effects.

REFERENCE NUMERALS

S depressed space portion
10 indicating instrument
11 instrument body
12 needle shaft
13 needle
20 display panel
21 display portion
22 through hole
30 circuit board
31 through hole
40 middle case
41 side wall portion
42 horizontal wall portion
43 cylindrical portion
44 reflecting wall portion
45 reflecting surface portion
50 upper case
51 see-through panel member
52 facing panel member
60 lower case
70, 71 light source (light-emitting diode)
400 flange portion
401 resilient arm strip
402 hook portion
403 locking portion
510 locking portions
511 resilient arm strip
512 hook portion
520 engaging portion
521 resilient arm strip
522 hook portion
523 locking portions
600 engaging portion
610 placing portion
620 placing portion
621 rising wall portion
622 placing surface portion
623 opening window portion

The invention claimed is:

1. An instrument device comprising:
a display panel arranged on a front side of an indicating instrument;
a circuit board formed of a hard material on which the indicating instrument is mounted;
a middle case arranged on a front side of the circuit board and formed of a resin material for placing the display panel;
an upper case arranged on the front side of the middle case and formed of a resin material which allows seeing therethrough at least on a front surface thereof;
a lower case formed of a resin material which covers the middle case and the circuit board, wherein:
the middle case is provided with a flange portion on a peripheral edge portion thereof for being held by being clamped between the upper and lower cases,
one of the upper case or the lower case is provided with first locking portions on respective outer peripheral portions thereof at intervals, and the other one of the upper case or the lower case is provided with engaging portions configured to engage corresponding first locking portions,
the middle case is integrally provided with a second locking portion configured to engage an inside of the lower case so as to clamp and hold the circuit board between the lower case and the middle case,
the second locking portion is visible from an outside of the lower case,
the lower case is provided with a rising wall portion formed so as to rise toward a circuit board side, and a placing portion continuing from the rising wall portion and supporting a back side of the circuit board, the placing portion is provided with an opening window portion, the circuit board is provided with a through hole at a position corresponding to the opening window portion, and the middle case is integrally provided with the second locking portion configured to engage a lower case side corresponding to the through hole and the opening window portion, the lower case is provided with a depressed space portion formed of the rising wall portion and the placing portion, and
the second locking portion is visible from the depressed space portion.

2. The instrument device according to claim 1, wherein the circuit board is clamped and held between the lower case and the middle case.

3. The instrument device according to claim 2, wherein the lower case is provided with a placing shoulder portion projecting from a bottom surface portion of the lower case toward the circuit board.

* * * * *